United States Patent
Retersdorf

(10) Patent No.: US 11,465,756 B2
(45) Date of Patent: Oct. 11, 2022

(54) BOOTSTRAP AIR CYCLE WITH VAPOR POWER TURBINE

(71) Applicant: Hamilton Sundstrand Corporation, Charlotte, NC (US)

(72) Inventor: Alan Retersdorf, Avon, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 395 days.

(21) Appl. No.: 16/707,089

(22) Filed: Dec. 9, 2019

(65) Prior Publication Data

US 2021/0171204 A1 Jun. 10, 2021

(51) Int. Cl.
*B64D 13/06* (2006.01)
*F25B 9/00* (2006.01)

(52) U.S. Cl.
CPC .............. *B64D 13/06* (2013.01); *F25B 9/004* (2013.01); *B64D 2013/0618* (2013.01); *B64D 2013/0648* (2013.01); *B64D 2013/0674* (2013.01); *B64D 2013/0688* (2013.01); *F05B 2220/50* (2013.01)

(58) Field of Classification Search
CPC .................. B64D 13/06; B64D 13/064; B64D 2013/0618; B64D 2013/0648; B64D 2013/0674; B64D 2013/0688; F25B 9/004; F05B 2220/50
See application file for complete search history.

(56) References Cited

U.S. PATENT DOCUMENTS

| 7,987,683 | B2 | 8/2011 | Andres | |
|---|---|---|---|---|
| 9,874,379 | B2 | 1/2018 | Andres | |
| 10,207,809 | B2 | 2/2019 | Koerner et al. | |
| 10,288,548 | B2 | 5/2019 | Silva et al. | |
| 2007/0119205 | A1* | 5/2007 | Zywiak | B64D 13/06 62/401 |
| 2013/0160472 | A1* | 6/2013 | Klimpel | B64D 13/08 62/401 |
| 2017/0057641 | A1 | 3/2017 | Koerner et al. | |
| 2018/0297709 | A1* | 10/2018 | Bruno | B64D 13/02 |
| 2019/0284965 | A1 | 9/2019 | Retersdorf et al. | |

FOREIGN PATENT DOCUMENTS

| WO | 9902401 A1 | 1/1999 |
|---|---|---|
| WO | 2012022758 A1 | 2/2012 |

OTHER PUBLICATIONS

Extended European Search Report; International Application No. 20208711.0-1010; International Filing Date Nov. 19, 2020; dated Apr. 29, 2021; 7 pages.

* cited by examiner

*Primary Examiner* — Joseph F Trpisovsky
(74) *Attorney, Agent, or Firm* — Cantor Colburn LLP

(57) ABSTRACT

A system includes a first fluid flow path configured to condition a pressurized medium and deliver the pressurized medium to one or more loads. The first fluid flow path including an air cycle machine. A second fluid flow path is configured to circulate a working fluid. The second fluid flow path includes a heat exchanger thermally coupled to the first fluid flow path. Within the heat exchanger, heat extracted from the pressurized medium is transferred to the working fluid. The second fluid flow path additionally includes a turbine operably coupled to the air cycle machine, a condenser, and a pump operable to circulate the working fluid through at least a portion of the second fluid flow path. The turbine is rotationally driven by expanding the working fluid across the turbine.

19 Claims, 3 Drawing Sheets

BOOTSTRAP AIR CYCLE WITH VAPOR POWER TURBINE

BACKGROUND

This present disclosure relates generally to gas turbine engine and, more particularly, to a system powered by bleed air extracted from the gas turbine engine.

Gas turbine engines operate by compressing a primary air flow stream received through an inlet, combusting an air-fuel mixture within a combustor, and directing the exhaust stream of the combustion process to perform work on a turbine before discharging the exhaust. Some gas turbine engines include auxiliary flow paths that extract a portion of the primary air flow passing through a compressor section of the gas turbine engine to form a bleed air stream. Bleed air can be used to perform work ancillary to the primary combustion process of the gas turbine engine, among other functions.

For example, in a typical environmental control system (ECS), bleed air provides the air needed to power an air cycle machine (ACM) of the ECS, remove aircraft heat loads, and provide air for other functions. In particular, air cycle machines provide a means of conditioning air provided to an aircraft passenger cabin and/or other aircraft systems. Air cycle machines operate by expanding compressed bleed air across a turbine in which bleed air imparts potential and/or kinetic energy to turbine blades to cause rotation of the turbine shaft. Because bleed air extracted from a compressor section of the gas turbine engine has elevated pressure and temperature relative to an upstream compressor stage and ambient air conditions, a heat exchanger is used to reduce the bleed air temperature prior to the air cycle machine. Typically, the waste heat is discharged to the ambient environment without preforming any work and thereby reduces an overall efficiency of the gas turbine engine.

Because increasing gas turbine engine efficiency continues to be a goal for aircraft engine manufacturers, a need exists to utilize the waste bleed air heat to perform work for auxiliary engine systems and/or other aircraft systems.

BRIEF DESCRIPTION

According to one embodiment, a system includes a first fluid flow path configured to condition a pressurized medium and deliver the pressurized medium to one or more loads. The first fluid flow path including an air cycle machine. A second fluid flow path is configured to circulate a working fluid. The second fluid flow path includes a heat exchanger thermally coupled to the first fluid flow path. Within the heat exchanger, heat extracted from the pressurized medium is transferred to the working fluid. The second fluid flow path additionally includes a turbine operably coupled to the air cycle machine, a condenser, and a pump operable to circulate the working fluid through at least a portion of the second fluid flow path. The turbine is rotationally driven by expanding the working fluid across the turbine.

In addition to one or more of the features described above, or as an alternative, in further embodiments the first fluid flow path is an open-loop path and the second fluid flow path is a closed-loop path.

In addition to one or more of the features described above, or as an alternative, in further embodiments the working fluid is configured to flow through the heat exchanger, the turbine, the condenser, and the pump sequentially.

In addition to one or more of the features described above, or as an alternative, in further embodiments the air cycle machine includes a compressor and another turbine operably coupled by a shaft, the turbine of the second fluid flow path being mounted to the shaft.

In addition to one or more of the features described above, or as an alternative, in further embodiments the air cycle machine further comprises a fan driven by the shaft.

In addition to one or more of the features described above, or as an alternative, in further embodiments working fluid within the condenser is cooled from a gaseous phase to a liquid phase via a heat exchange relationship with a cooling medium.

In addition to one or more of the features described above, or as an alternative, in further embodiments the system includes a ram air duct, the condenser being arranged within the ram air duct such that the cooling medium is ram air.

In addition to one or more of the features described above, or as an alternative, in further embodiments the first fluid flow path includes a second heat exchanger arranged within the ram air duct, the second heat exchanger being located downstream from the condenser relative to a flow of the cooling medium.

In addition to one or more of the features described above, or as an alternative, in further embodiments working fluid within the condenser is cooled from a gaseous phase to a liquid phase via a heat exchange relationship with a the pressurized medium.

According to another embodiment, a method includes directing a pressurized medium through a first fluid flow path including an air cycle machine, circulating a working fluid through a second fluid flow path, transferring heat from the pressurized medium to the working fluid at a heat exchanger thermally coupling the first fluid flow path and the second fluid flow path, extracting work from the working fluid within a turbine, and driving one or more rotatable components of the air cycle machine in response to extracting work from the working fluid within the turbine.

In addition to one or more of the features described above, or as an alternative, in further embodiments directing the pressurized medium through the first fluid flow path further comprises extracting a pressurized medium from a pressurized medium source, conditioning the pressurized medium, and delivering conditioned pressurized medium to one or more loads.

In addition to one or more of the features described above, or as an alternative, in further embodiments circulating a working fluid through a second fluid flow path further comprises circulating working fluid through the heat exchanger, a turbine, a condenser, and a pump sequentially.

In addition to one or more of the features described above, or as an alternative, in further embodiments the working fluid circulates through a second fluid flow path via the pump.

In addition to one or more of the features described above, or as an alternative, in further embodiments the air cycle machine includes a compressor and the compressor is driven by extracting work from the working fluid within the turbine.

In addition to one or more of the features described above, or as an alternative, in further embodiments the air cycle machine includes a fan and the fan is driven by extracting work from the working fluid within the turbine.

In addition to one or more of the features described above, or as an alternative, in further embodiments the first fluid flow path is an open-loop path and the second fluid flow path is a closed-loop path.

In addition to one or more of the features described above, or as an alternative, in further embodiments the pressurized medium is bleed air.

In addition to one or more of the features described above, or as an alternative, in further embodiments the working fluid is one of refrigerant, water, ammonia, and carbon dioxide.

In addition to one or more of the features described above, or as an alternative, in further embodiments the system is at least one pack of an environmental control system of an aircraft.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Figure 1:
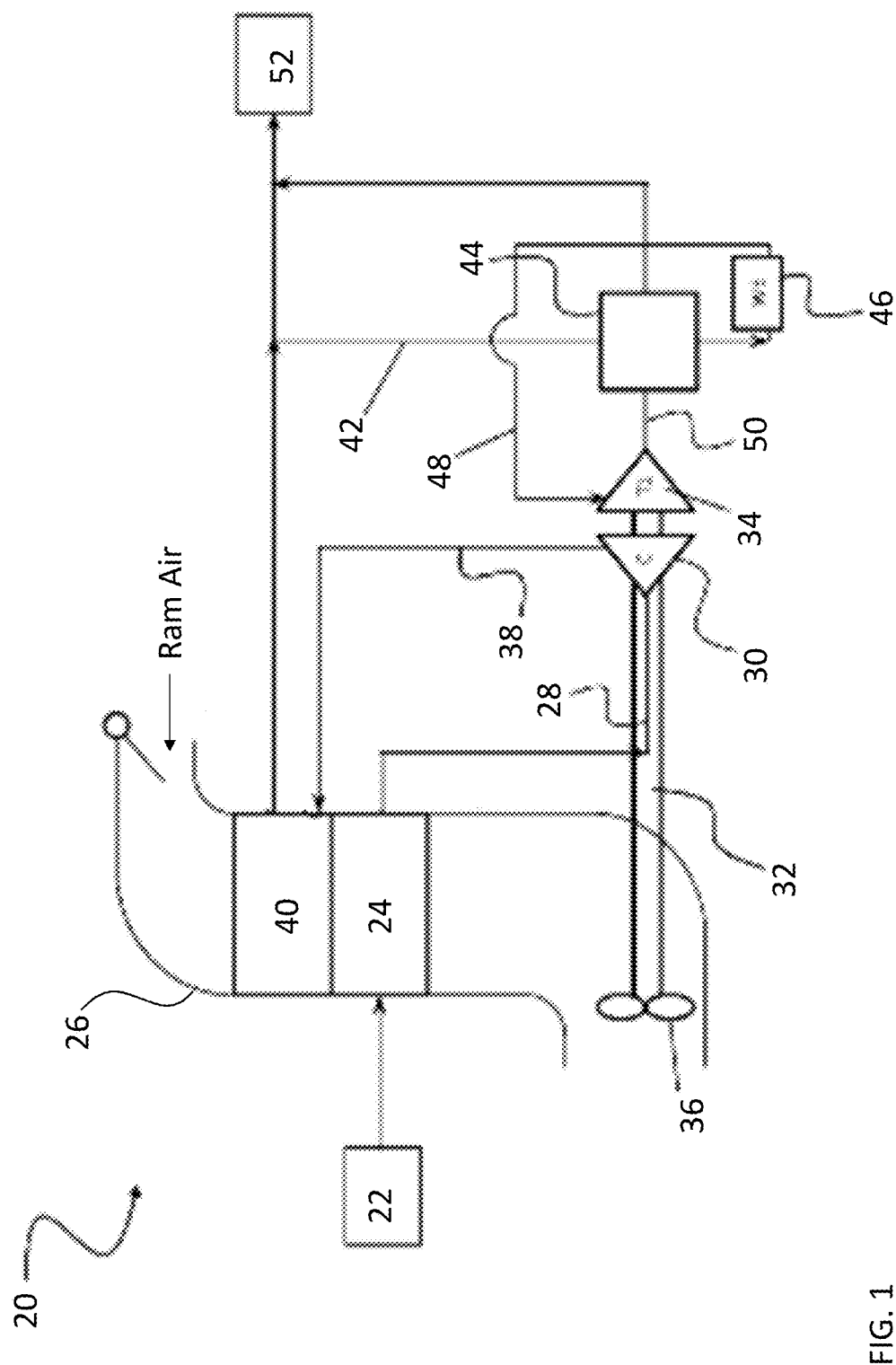
FIG. 1 is a schematic diagram of an example of a pack of an environmental control system.

Referring now to FIG. 1, an example of a pack 20 of an environmental control system (ECS) of an aircraft is illustrated. As shown, the pack 20 defines a first fluid flow path of a pressurized medium A, such as air for example, received from a pressurized medium source 22. Within the first fluid flow path, the pressurized medium is conditioned to be supplied to one or more loads of the aircraft. Although a single pack 20 is illustrated, an ECS including any number of ECS packs 20 configured to supply a conditioned air to one or more loads of the aircraft is also within the scope of the disclosure. In one embodiment, the pressurized medium A is bleed air. As used herein, the term "bleed air" includes pressurized air originating from or being "bled" from, an engine or auxiliary power unit of the aircraft. It shall be understood that one or more of the temperature, humidity, and pressure of the bleed air may vary based upon the compressor stage and revolutions per minute of the engine or auxiliary power unit from which the air is drawn. For example, bleed air may be drawn from either a low pressure compressor spool or a high pressure compressor spool of an engine, and bleed air drawn from the low pressure compressor spool will have a relatively lower pressure than bleed air drawn from the high pressure compressor spool.

In the illustrated, non-limiting embodiment, the pressurized medium A from the pressurized medium source 22 is provided to a primary heat exchanger 24 arranged within a ram air duct 26 such that the pressurized medium A is in a heat exchange relationship with a cooling medium, such as ram or ambient air. After the pressurized medium A is cooled in the primary heat exchanger 24, the resulting cooler pressurized medium A is communicated through a passage 28 to a compressor 30. Within the compressor 30, the pressurized medium A is compressed to a high pressure. The compressor 30 may be located on a common shaft 32 with a first turbine 34 and a fan 36. Together the fan 36, compressor, 30, and first turbine 34 define an air cycle machine (ACM).

Compressed medium exits the compressor 30 through a passage 38 and is provided to a secondary heat exchanger 40 configured to further cool the pressurized medium A within the secondary heat exchanger 40 with a ram air or ambient air flow. As shown, the secondary heat exchanger 40 is also arranged within the ram air duct 26. Compressed, cooled pressurized medium A including water vapor exits from the secondary heat exchanger 40 and flows through a duct 42 to a condenser 44. The condenser 44 is configured to further cool the pressurized medium A by condensing and separating the water into a water extractor 46. Dehumidified pressurized medium A exits the water extractor 46 and is provided, through a passage 48, to a first turbine 34. The pressurized medium A is expanded and water vapor in the pressurized medium A is further condensed through the first turbine 34 of the ACM. The cooled pressurized medium A flows through a passage 50 back to the condenser 44, where the pressurized medium A is heated to a relatively warmed temperature, and is then supplied to the loads (illustrated schematically at 52) of the aircraft, such as to the cabin for example. The pack 20 and the first fluid flow path defined by the pack 20 illustrated and described herein is intended as an example only. It should be understood that a first fluid flow path including additional components or another configuration is also within the scope of the disclosure.

In a typical pack of an environmental control system (ECS) of a vehicle, as shown in FIG. 1, at least one heat exchanger is arranged upstream from an air cycle machine relative to a flow of pressurized medium. Within the heat exchanger, such as the primary heat exchanger 24 for example, waste heat from the pressurized medium A is rejected to a ram air circuit. The ram air flow passes through the primary heat exchanger 24 and receives the heat rejected from the pressurized medium A before being discharged to the ambient environment.

In an embodiment, the waste heat that is rejected from the pressurized medium A can be utilized to improve the efficiency of the ECS by adapting the pack 20 of the ECS to include a closed loop configured as a Rankine cycle. A Rankine cycle uses a working fluid to convert heat into mechanical work while the working fluid undergoes a phase change.

Figure 2:
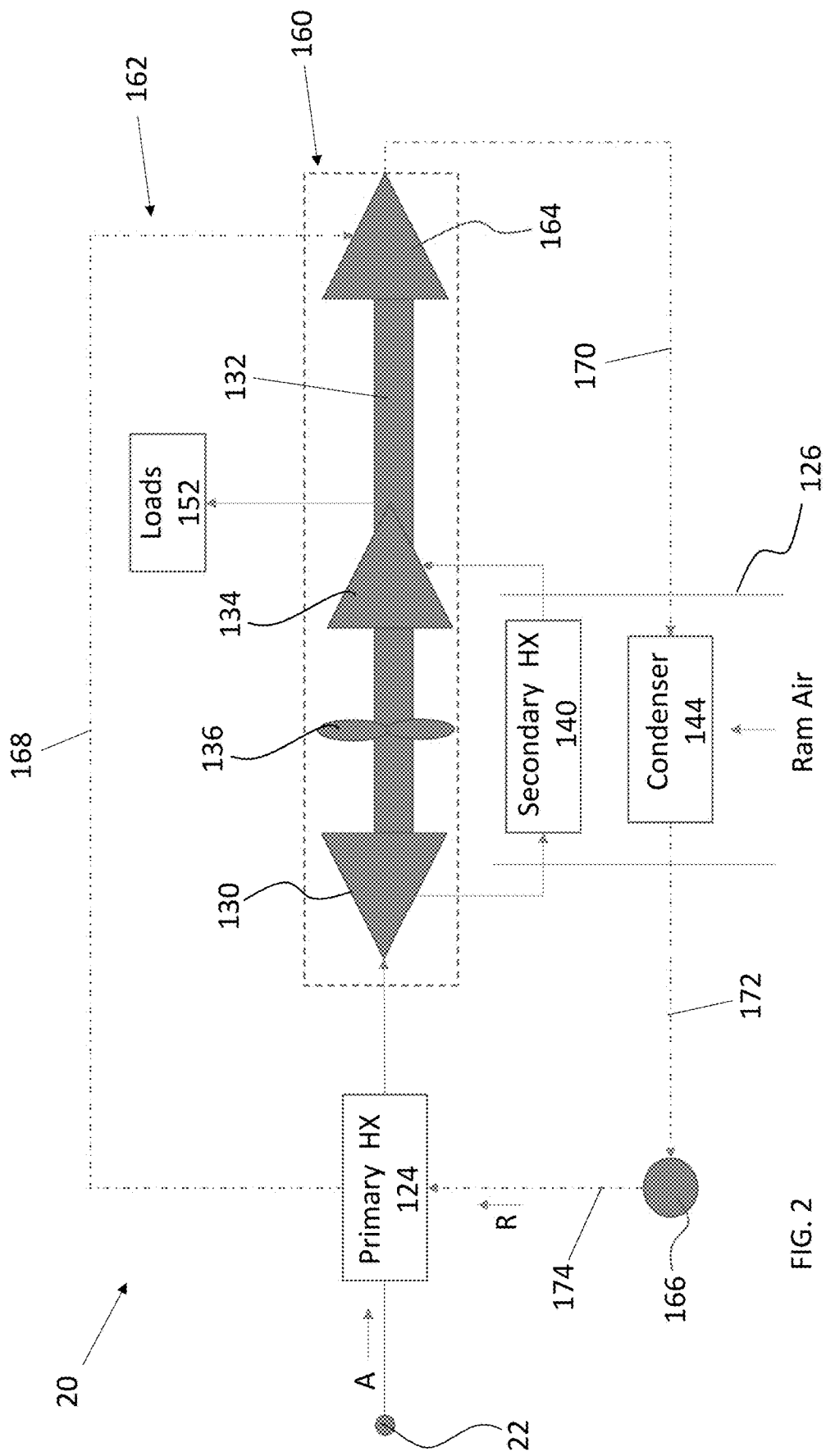
FIG. 2 is a schematic diagram of a portion of a pack of an environmental control system according to an embodiment.

With reference now to FIG. 2, a simplified schematic diagram of a portion of a pack 120 of an ECS is illustrated. As previously described with respect to FIG. 1, the ECS pack 120 includes a first fluid flow path that receives a pressurized medium A from a pressurized medium source 122 and delivers a conditioned form of the pressurized medium A to one or more loads 152. As previously described, the first flow path of the pack 120 includes an air cycle machine, identified at 160, having one or more components configured to receive the pressurized medium A. As shown, the air cycle machine 160 includes a compressor 130 and a turbine 134. The compressor 130 is configured to receive pressurized medium, and imparts work to the pressurized medium A, thereby increasing a static pressure and/or temperature of the pressurized medium A. The turbine 134 includes a rotatable impeller (not shown) having a blade geometry configured to extract kinetic energy and/or potential energy from the pressurized medium A. The turbine 134 is arranged downstream from the compressor 130 relative to a flow of the pressurized medium A.

In the illustrated embodiment of FIG. 2, the pack 120 of the ECS additionally includes a second, closed loop flow path, identified at 162, arranged in a heat exchange relationship with the first fluid flow path. A working fluid R circulates through the second fluid flow path 162 to form a Rankine cycle. Examples of suitable working fluids R include, but are not limited to refrigerant, water, ammonia, and carbon dioxide.

In the illustrated, non-limiting embodiment, the second fluid flow path 162 includes a heat exchanger 124, a turbine 164, a condenser 144 and a pump 166 arranged sequentially in series relative to a direction of flow of the working fluid R. A first conduit 168 connects an outlet of the heat exchanger 124 to an inlet of the turbine 164 and a second conduit 170 fluidly couples an outlet of the turbine 164 to an inlet of the condenser 144. A third conduit 172 connects the outlet of the condenser 144 to an inlet of the pump 166 and a fourth conduit 174 fluidly couples an outlet of the pump 166 to the inlet of the heat exchanger 124. It should be understood that the illustrated second, closed loop flow path is intended as an example only and that a closed loop flow path including additional or other components is also within the scope of the disclosure.

In an embodiment, the heat exchanger 124 is the primary heat exchanger disposed within the first fluid flow path. However, the heat exchanger 124 has been positioned at a location remote from the ram air duct 126. Accordingly, the pressurized medium A within the heat exchanger 124 is cooled via the working fluid R rather than by the ram air. Accordingly, the first fluid flow path and the second fluid flow path are thermally coupled at the heat exchanger 124. The heat exchanger 124 can have any conventional design that places a first medium, such as bleed air for example, within open-loop path in a heat exchange relationship with the working fluid circulating within the closed-loop path. Because heat exchanger 124 is configured to vaporize or boil the working fluid R, the flowrate per unit area of heat transferred from pressurized medium A to the working fluid R, or heat flux, is greater than a threshold heat flux necessary to convert working fluid R from liquid phase at heat exchanger inlet to a gaseous phase at heat exchanger outlet. Furthermore, the minimum design heat flux exceeds the threshold heat flux by a margin sufficient to account for a range of ambient conditions and engine operating conditions such that conduits contain primarily gaseous working fluid for a range of ambient conditions and engine operating conditions.

Turbine 164 is adapted to extract potential energy (i.e., energy derived from working fluid static pressure), kinetic energy (i.e., energy derived from working fluid dynamic pressure or fluid velocity), or a combination of potential and kinetic energy. Extracting energy from the gaseous working fluid R involves providing blade geometry (not shown) to interact with gaseous working fluid R such that gaseous working fluid imparts rotation to the turbine 164. Due to the extraction of energy, working fluid R output from the turbine 164 has at least one of: an outlet pressure that is less than an inlet pressure, an outlet velocity that is less than an inlet velocity, and c) an outlet pressure and velocity that are less than an inlet pressure and velocity, respectively.

The condenser 144 arranged within the second closed loop fluid flow path may be the same condenser or alternatively, a different condenser than identified within the first fluid flow path. In the illustrated, non-limiting embodiment of FIG. 2, the condenser 144 is positioned within the ram air duct 126. The condenser 144 can be a heat exchanger having any conventional design that converts gaseous working fluid R into liquid working fluid R by placing the working fluid in a heat exchange relationship with a heat sink. As shown in the FIG., the condenser 144 places working fluid R in a heat exchange relationship with a cooling medium of the ram air circuit, such as ram air for example. Although the condenser 144 is illustrated as being arranged upstream from the secondary heat exchanger 140 relative to the flow of ram air within the ram air duct 126, embodiments where the condenser 144 is arranged downstream from the secondary heat exchanger 140 are also contemplated herein.

Figure 3:
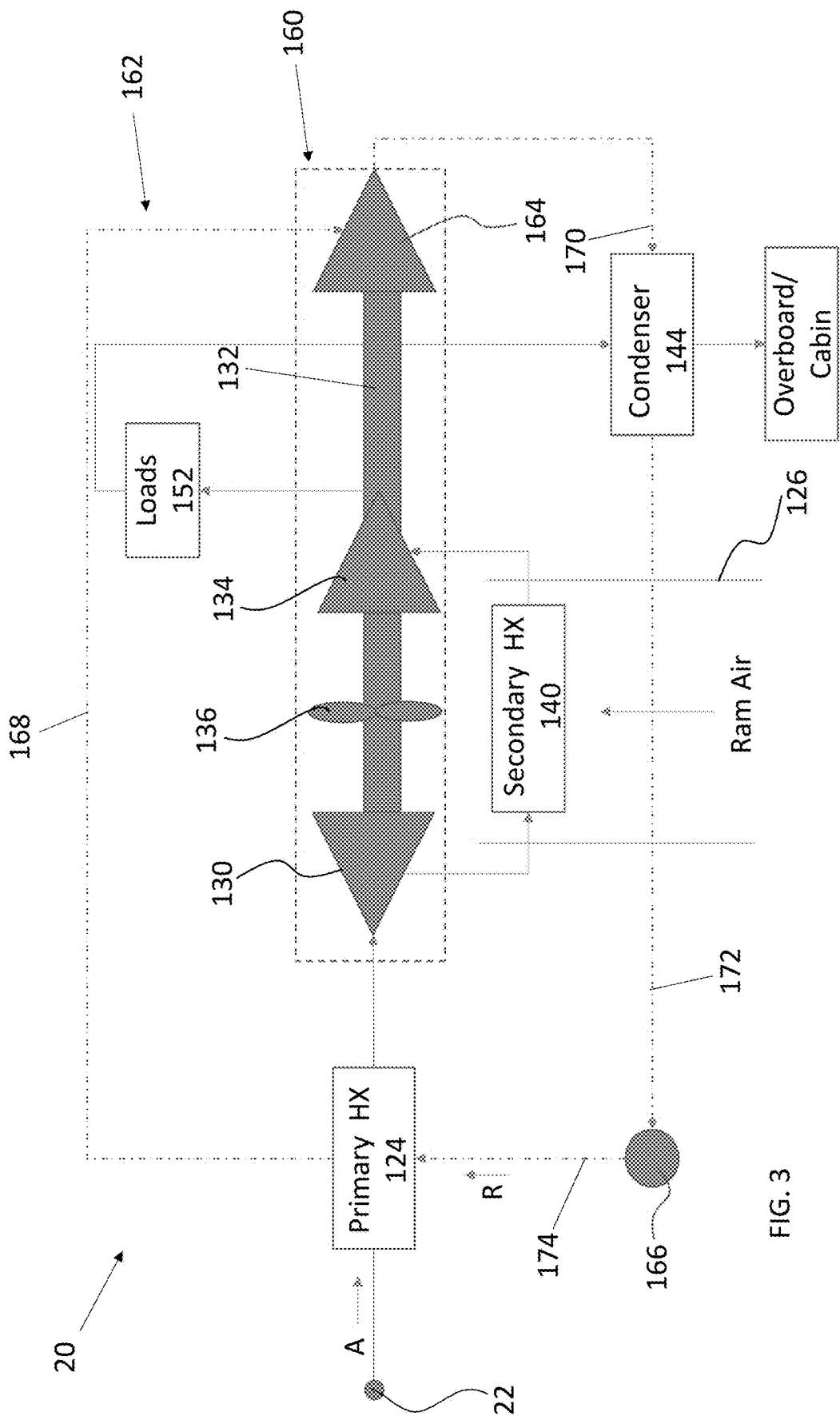
FIG. 3 is another schematic diagram of a portion of a pack of an environmental control system according to an embodiment.

In another embodiment, as best shown in FIG. 3, the condenser 144 may be located external to the ram air duct 126. In such embodiments, the condenser may thermally couple the first and second fluid flow loops. As shown, a portion of the pressurized medium A, such as provided to one or more loads 152, or alternatively, discharged from the one or more loads 152, such as cabin discharge air for example, is provided to the condenser 144, before being dumped overboard or delivered to the cabin. In such embodiments, heat is configured to transfer from the working fluid R to the pressurized medium A within the condenser 144.

The pump 166 can be a mechanically-driven or an electrically-driven pump configured to act on and impart work to working fluid R received through a pump inlet. Due to pressure losses associated with circulating working fluid through closed-loop fluid flow path, the work imparted by pump to the working fluid R causes a pressure of working fluid R at the pump outlet to be greater than a pressure of working fluid R at the pump inlet by an amount sufficient to overcome pressure losses at a design flow rate of working fluid through closed-loop.

Within the second fluid flow path 162, the thermal energy extracted from the pressurized medium A, is utilized to rotationally drive the turbine 164 to convert the thermal energy into mechanical work. This work can be used to increase the efficiency of the pack 120 by rotationally coupling the turbine 164 to another component. In the illustrated, non-limiting embodiment, the turbine 164 is formed as a portion of the air cycle machine 160. Accordingly, the turbine 164 is operably coupled to the compressor 130, turbine 134, and fan 136 via the shaft 132. By mounting the turbine 164 of the second fluid flow path 162 to the shaft 132 of the air cycle machine 160, the work extracted within the turbine 164 can be used to rotate the shaft 132, thereby driving the compressor 130 and/or the fan 136. Although the second fluid flow path 162 is illustrated as being fluidly coupled to the first fluid flow path defined by a single pack 120 of an environmental control system, it should be understood that in embodiments where an environmental control system includes multiple packs 120, a single second fluid flow path 162 may be used for multiple packs 120, each pack 120 may be associated with its own second fluid flow path 162, or alternatively, multiple second fluid flow paths 162 that share one or more components may be associated with the plurality of packs 120.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
a first fluid flow path configured to condition a pressurized medium and deliver the pressurized medium to one or more loads, the first fluid flow path including a compressor of an air cycle machine;
a second fluid flow path configured to circulate a working fluid, the second fluid flow path including:
a heat exchanger thermally coupled to the first fluid flow path, wherein within the heat exchanger, heat extracted from the pressurized medium is transferred to the working fluid;
a turbine rotationally driven by expanding the working fluid across the turbine, wherein the turbine is operably coupled to the compressor of the air cycle machine by a shaft;
a condenser; and
a pump operable to circulate the working fluid through at least a portion of the second fluid flow path.

2. The system of claim 1, wherein the first fluid flow path is an open-loop path and the second fluid flow path is a closed-loop path.

3. The system of claim 1, wherein the working fluid is configured to flow through the heat exchanger, the turbine, the condenser, and the pump sequentially.

4. The system of claim 1, wherein the air cycle machine further comprises another turbine operably coupled to the compressor by the shaft, the turbine of the second fluid flow path being mounted to the shaft.

5. The system of claim 4, wherein the air cycle machine further comprises a fan driven by the shaft.

6. The system of claim 1, wherein the working fluid within the condenser is cooled from a gaseous phase to a liquid phase via a heat exchange relationship with a cooling medium.

7. The system of claim 6, wherein the system includes a ram air duct, the condenser being arranged within the ram air duct such that the cooling medium is ram air.

8. The system of claim 6, wherein the first fluid flow path includes a second heat exchanger arranged within the ram air duct, the second heat exchanger being located downstream from the condenser relative to a flow of the cooling medium.

9. The system of claim 1, wherein the working fluid within the condenser is cooled from a gaseous phase to a liquid phase via a heat exchange relationship with the pressurized medium.

10. The system of claim 1, wherein the pressurized medium is bleed air.

11. A method comprising:
directing a pressurized medium through a first fluid flow path including a compressor of an air cycle machine;
circulating a working fluid through a second fluid flow path;
transferring heat from the pressurized medium to the working fluid at a heat exchanger thermally coupling the first fluid flow path and the second fluid flow path;
extracting work from the working fluid within a turbine; and
driving the compressor of the air cycle machine in response to extracting work from the working fluid within the turbine.

12. The method of claim 11, wherein directing the pressurized medium through the first fluid flow path further comprises:
extracting the pressurized medium from a pressurized medium source;
conditioning the pressurized medium; and
delivering conditioned pressurized medium to one or more loads.

13. The method of claim 11, wherein circulating the working fluid through the second fluid flow path further comprises:
circulating the working fluid through the heat exchanger, the turbine, a condenser, and a pump sequentially.

14. The method of claim 13, wherein the working fluid circulates through the second fluid flow path via the pump.

15. The method of claim 11, wherein the air cycle machine includes a fan and the fan is driven by extracting work from the working fluid within the turbine.

16. The method of claim 11, wherein the first fluid flow path is an open-loop path and the second fluid flow path is a closed-loop path.

17. The method of claim 11, wherein the pressurized medium is bleed air.

18. The method of claim 11, wherein the working fluid is one of refrigerant, water, ammonia, and carbon dioxide.

19. The method of claim 11, wherein the system is at least one pack of an environmental control system of an aircraft.

* * * * *